MOBILE SELF-ERECTING MARINE PLATFORMS

Original Filed Oct. 12, 1955 4 Sheets-Sheet 1

Inventor:
Ivan W. Mangone

MOBILE SELF-ERECTING MARINE PLATFORMS

Original Filed Oct. 12, 1955 4 Sheets-Sheet 2

Inventor:
Ivan W. Mangone

MOBILE SELF-ERECTING MARINE PLATFORMS

Original Filed Oct. 12, 1955 4 Sheets-Sheet 3

Inventor:
Ivan W. Mangone

MOBILE SELF-ERECTING MARINE PLATFORMS

Original Filed Oct. 12, 1955 4 Sheets-Sheet 4

Inventor:
Ivan W. Mangone

United States Patent Office

Re. 26,073
Reissued Sept. 6, 1966

26,073

MOBILE SELF-ERECTING MARINE PLATFORMS

Ivan W. Mangone, Houston, Tex., assignor to Offshore Structures & Service Co., Houston, Tex., a partnership Original No. 2,968,930, dated Jan. 24, 1961, Ser. No. 539,960, Oct. 12, 1955. Application for reissue Oct. 8, 1965, Ser. No. 495,768
6 Claims. (Cl. 61—46.5)

Matter enclosed in heavy brackets [ ] appears in the original patent but forms no part of this reissue specification; matter printed in italics indicates the additions made by reissue.

This invention relates to new and useful improvements and structural refinements in off-shore well drilling equipment, and more particularly the invention concerns itself with a mobile, self-erecting marine platform.

A platform of this type must be capable of economical transportation to a desired location, expeditious and economical erection with a minimum of auxiliary equipment in rough water, dependable and quick anchorage to sea beds of various condition and, when the drilling operation is completed, expeditious removal from around a well head in readiness for transportation to a new site.

The principal object of the instant invention is to satisfy all of the foregoing requirements, this being attained by the provision of a platform consisting primarily of a buoyant platform member surrounded by a framework which may be raised and lowered relative to the platform member so as to be selectively floated thereby and rested on the sea bed.

An important feature of the invention resides in the provision of an articulated framework having complemental, hinged sections adapted for folding and unfolding movement between a horizontally extended travelling position and an erected operative position, whereby the entire apparatus may be conveniently transported even in relatively shallow water and quickly erected at the site of operation without the use of auxiliary equipment such as floating cranes, and the like.

Another feature of the invention involves the provision of self-contained means for anchoring the framework of the platform to the sea bed, and further means for loosening the anchoring means from the sea bed when the apparatus is to be moved to another location.

With the foregoing more important objects and features in view and such other objects and features as may become apparent as this specification proceeds, the invention resides in the arrangement of parts and details of construction substantially as shown in the accompanying drawings, wherein like characters of reference are employed to designate like parts and wherein.

Figure 1:
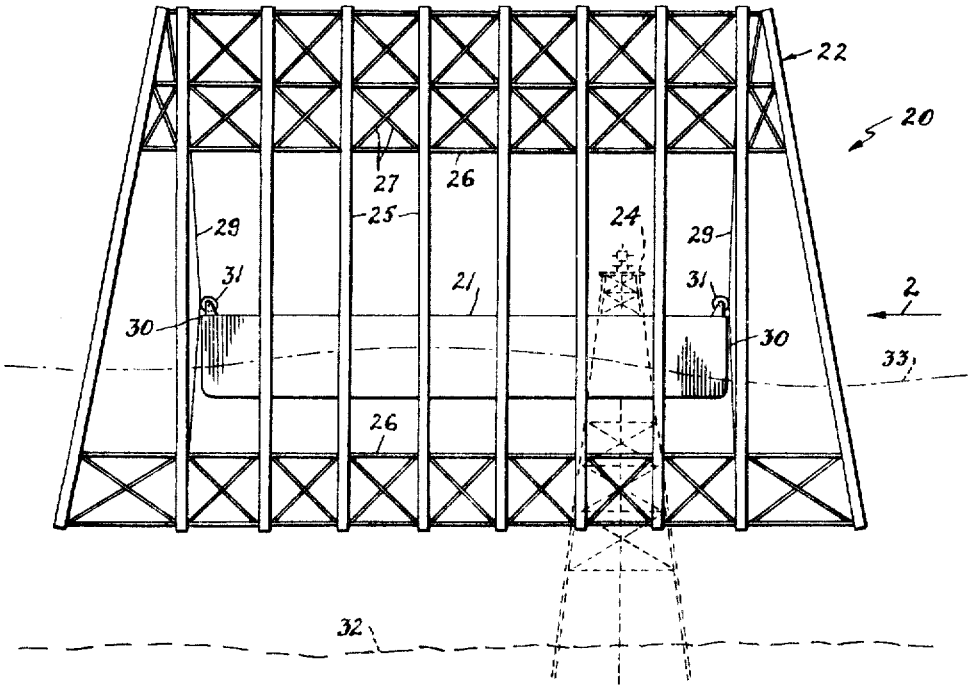
FIGURE 1 is a side elevational view of the invention.

Referring now to the accompanying drawings in detail, particularly to FIGURES 1–4 thereof, the mobile self-erecting marine platform is designated by the general reference numeral 20 and consists primarily of two main components, namely, a buoyant platform member 21 and a structural framework 22 which surrounds the same.

The platform member 21 is of any suitable construction and is provided in one end portion thereof with an open-sided recess 23 to accommodate a conventional well head 24, as will be clearly apparent.

The framework 22 is fabricated from structural material including a plurality of upwardly extending members 25 which may be either girders or tubes and which may, if desired, be hollow to assist in the buoyancy of the apparatus as a whole. In any event, the members 25 are secured together by horizontal struts 26 and cross braces 27 and it is to be noted that the end portion of the framework 22 at the recessed end of the platfrom member 21 is open so as to afford a passage 28 for the well head 24 when the apparatus is to be moved in or out from around the well head.

The platform member 21 is operatively connected to the framework 22 by hoist lines 29, 30 operated by winches 31 aboard the platform member, it being understood from the foregoing that by actuating these winches the platform member may be raised or lowered relative to the framework, and vice versa.

Figure 2:
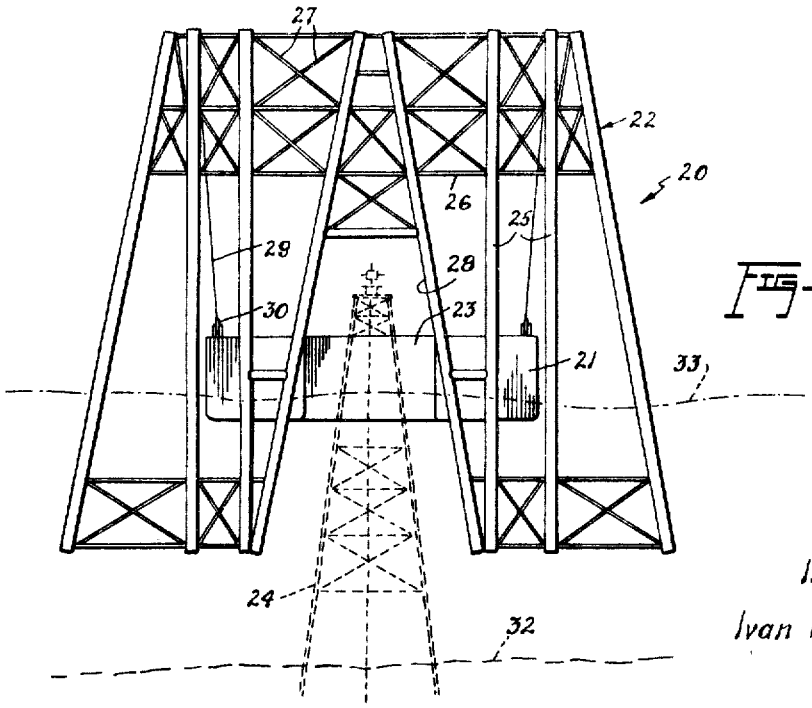
FIGURE 2 is an end view thereof, taken in the direction of the arrow 2 in FIGURE 1.
Figure 3:
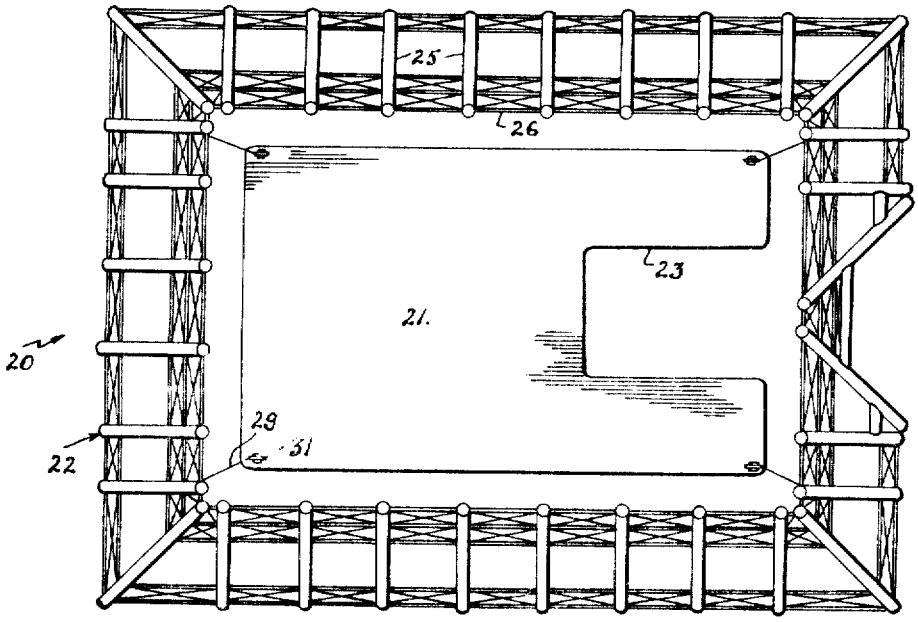
FIGURE 3 is a top plan view of the same.
Figure 4:
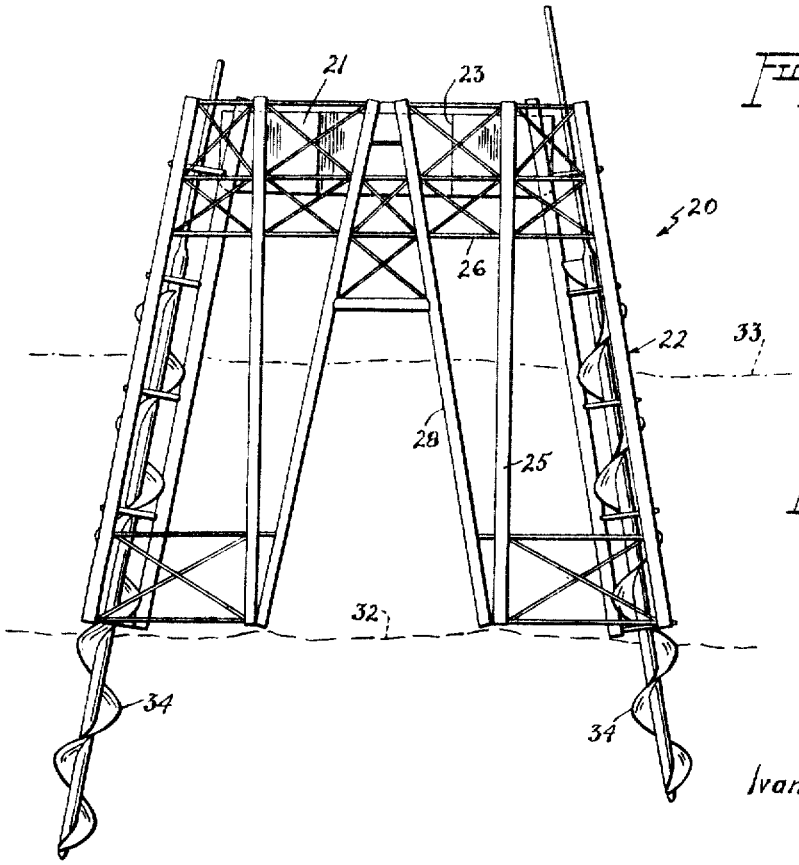
FIGURE 4 is an end view, similar to that shown in FIGURE 2 but with the platform member raised relative to the framework.
Figure 5:
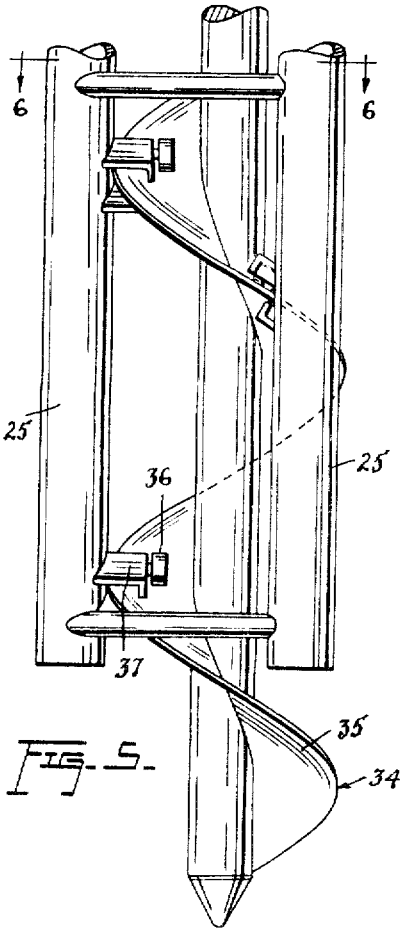
FIGURE 5 is a fragmentary elevational view on an enlarged scale of the anchoring means.
Figure 6:
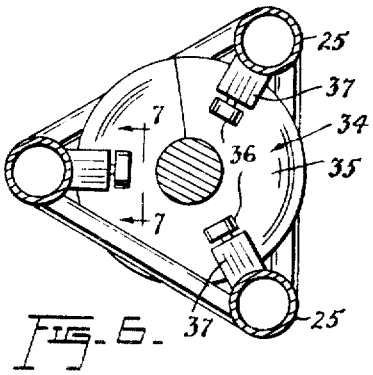
FIGURE 6 is a sectional detail, taken substantially in the plane of the line 6—6 in FIGURE 5.
Figure 7:
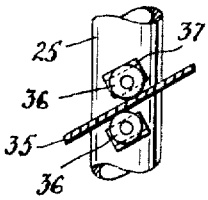
FIGURE 7 is a sectional detail, taken substantially in the plane of the line 7—7 in FIGURE 6.

The basic form of the invention is intended primarily for use in relatively deep water and, with the framework 22 raised relative to the platform member 21 as shown in FIGURES 1 and 2, the entire apparatus may be floated to the desired site of operation, as for example, around the well head 24. By actuating the winches 31 the framework 22 may be lowered with respect to the platform member so that the framework rests on the sea bed 32, as illustrated in FIGURE 4. Moreover, the platform member 21 may be raised relative to the framework as shown in the same figure, so that it is well clear of the highest wave crest on the water lever 33.

As shown in FIGURES 4–8, means are provided for anchoring the framework 22 to the sea bed, these means consisting of a set of anchoring screws 34 disposed in the corner portions of the framework and having spiral flights 35 supportably engaged by rotatable rollers 36 carried by suitable brackets 37 secured to the framework members 25. The screws 34 may be rotated by any suitable means so that they are projected downwardly from the framework 22 into the sea bed 32.

Figure 8:
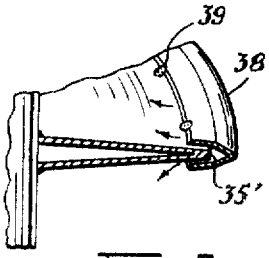
FIGURE 8 is a fragmentary sectional view of the anchoring screw of FIGURE 5 provided with means for loosening the same.

When the apparatus is to be moved to another location, the screws 34 are retracted into the framework and, as shown in FIGURE 8, means may be provided for loosening the screws from the sea bed by breaking the skin friction thereon. Such means comprise a channel-shaped member 38 enclosing in spaced relation the marginal edge 35' of the screw flight 35 and secured to the screw flight at spaced intervals, such as by spot welding 39. Suitable means are provided for delivering fluid such as air or water under pressure into the member 38 so that it is discharged through the spaces between the spot welds 39 to break skin friction on the screw flight 35. It will be also observed that the member 38 constitutes a marginal cutting edge for the screw flight.

Figure 9:
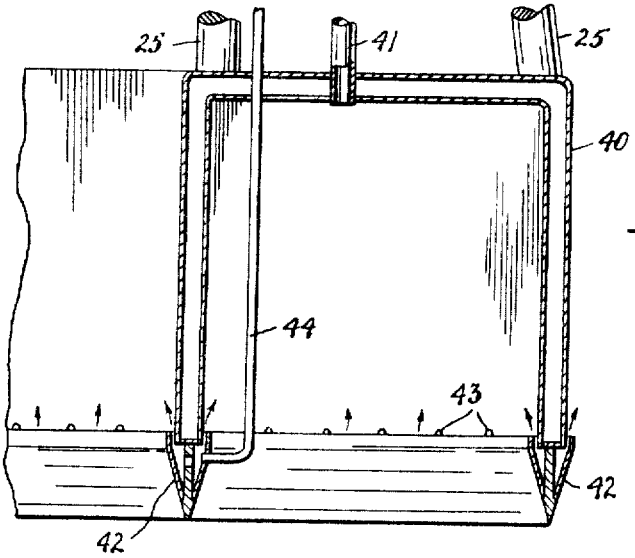
FIGURE 9 is a sectional detail of another form of anchoring means.

As an addition to or an alternative for the anchoring means already described, another form of anchoring means for the framework 22 is shown in FIGURE 9, wherein an inverted channel 40 is provided at the bottom edge of the framework to engage the sea bed. When such a channel becomes embedded in mud, lighter fluid such as air or water may be pumped into the channel through a suitable conduit 41 to develop sufficient lift for supporting the entire apparatus. The side flanges of the channel 40 effectively resist lateral movement from currents at the sea bed and provide effective anchoring means as skin friction with the mud develops thereon.

Means similar to that shown in FIGURE 8 are used for breaking the skin friction and loosening the channel 40 when the apparatus is to be moved, these means comprising channel-shaped members 42 provided at the lower edges of the channel 40 and secured thereto at spaced points 43. Air or water under pressure is delivered into the members 42 through a suitable conduit 44, for discharging through the spaces between the points 43 along both the inner and outer surfaces of the side flanges of the channel 40.

Figure 10:
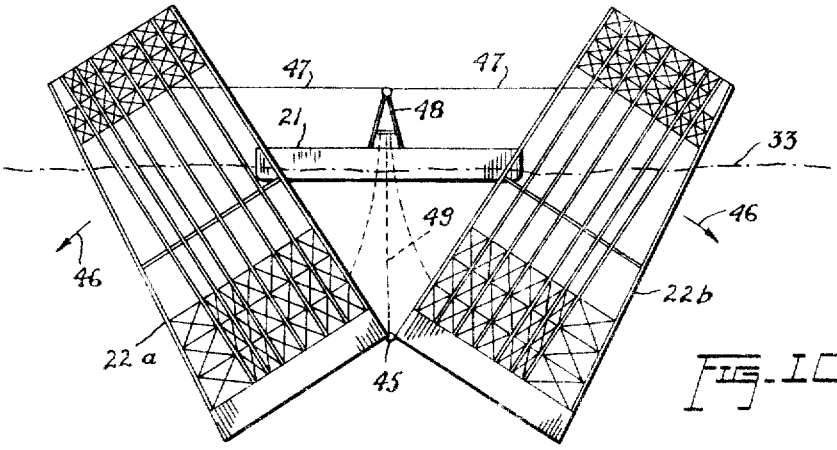
FIGURE 10 is a side elevational view, on a reduced scale, showing the articulated framework in the act of folding or unfolding.
Figure 12:
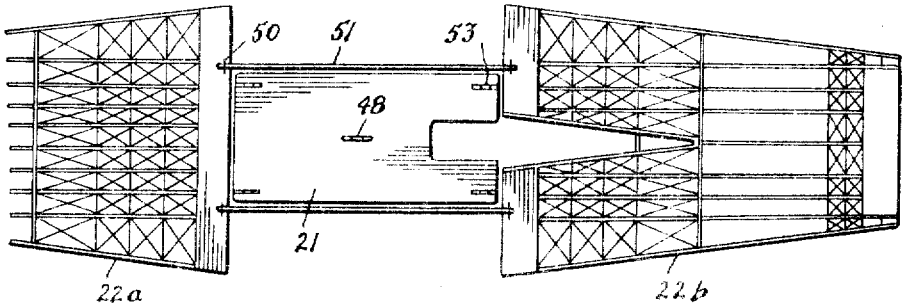
FIGURE 12 is a fragmentary top plan view of the apparatus shown in FIGURE 11 with the framework sections extended.
Figure 11:
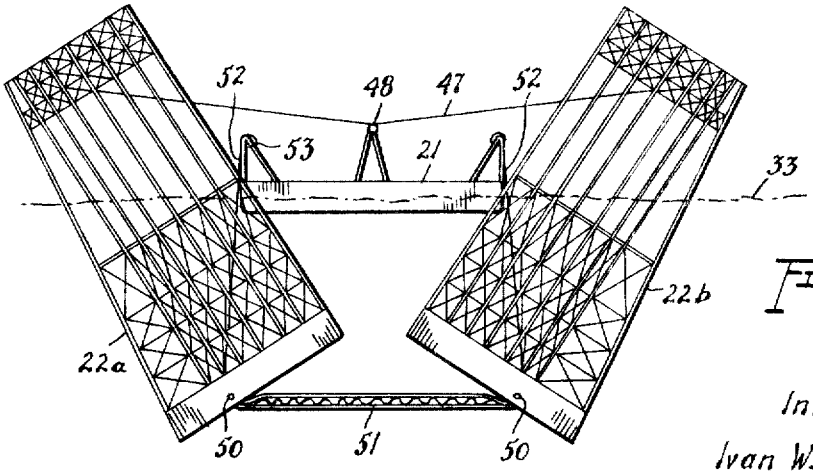
FIGURE 11 is a side elevational view showing a modified arrangement of the articulated framework in the act of folding or unfolding.

The accompanying FIGURES 10–12 show a modified form of the framework structure primarily intended for use in relatively shallow water. As such, FIGURE 10 illustrates the buoyant platform member 21 and a framework of an articulated construction comprising a pair of complemental half-sections 22a and 22b which are pivotally connected together as indicated at 45 so that they may be swung from the erected, operative position to a horizontally extended, substantially flat transporting position, as indicated by the arrows 46.

When the sections 22a, 22b are drawn together they assume the erected operative position as shown in FIGURES 1–4, but when they are unfolded into the horizontally extended position, they are substantially flat and have a very shallow draft so that the entire apparatus may be transported even in shallow water.

The sections 22a and 22b are folded and unfolded by suitable lines 47 connected to winches 48 aboard the platform member 21 and the raising and lowering of the framework relative to the platform member is effected by hoist lines 49 connected to the pivots 45 and/or other points on the structure.

In a slightly modified embodiment of the invention shown in FIGURES 11 and 12, the sections 22a and 22b are pivoted at the points 50 to an elongated carrier 51 suspended from the platform member 21 by hoist lines 52 of the winches 53.

It is to be particularly noted that in all instances the operative connection between the platform member and the framework is such that the apparatus may be transported, erected and relocated without the use of auxiliary equipment such as floating cranes, and the like.

While in the foregoing there have been shown and described the preferred embodiments of the invention, various modifications may become apparent to those skilled in the art to which the invention relates. Accordingly, it is not desired to limit the invention to this disclosure and various modifications may be resorted to, such as may lie within the spirit and scope of the appended claims,

What is claimed as new is:

*1.* In a mobile self-erecting marine platform, the combination of an upstanding marginal framework having a substantially rectangular plan when erected and defining a rectangular opening at the center thereof, said framework comprising a pair of complemental half-sections of a U-shaped plan when erected, said half-sections having upper and lower edges and pairs of opposing side edges which are in abutment when the framework is erected, hinge means provided on said opposing side edges at said lower edges of said half-sections whereby the same may be swung from their erected position outwardly and downwardly to a substantially horizontal travelling position wherein their lower edges are in abutment, a substantially rectangular buoyant platform member disposed in said opening and having its marginal edges spaced inwardly from said framework, winch means carried by said platform member, cables extending downwardly from said winch means to the lower edge portions of said half-sections adjacent said hinge means whereby said framework may be raised and lowered relative to the platform member with the latter having sufficient buoyancy to float the framework when the framework is raised, and cables extending from said winch means to upper edge portions of said half-sections whereby the same may be swung between their erected and travelling positions and whereby said platform member may be raised relative to the framework when the latter is erected.

*2. The device as defined in claim 1 together with means for releasably anchoring said framework to the sea bed when the framework is erected.*

*3. The device as defined in claim 2 wherein said anchoring means comprise inverted U-shaped channels provided at said lower edges of said half-sections, said channels having an open bottom, a closed top wall and a pair of transversely spaced side walls, said side walls having lower edges adapted to be embedded in the sea bed when said framework is erected with said top and side walls of the channels coacting with the sea bed to define a closed chamber within the channels, and means for pressure-delivering into said chamber a fluid lighter than the material of the sea bed, whereby to impart a factor of bouyancy to said framework and assist in loosening the framework from the sea bed.*

*4. The device as defined in claim 3 together with fluid discharging jets provided on said side walls of said channels, said jets being disposed at points spaced upwardly from the lower edges of said side walls and oriented in an upward direction, and means for delivering fluid under pressure to said jets, whereby to assist in loosening the framework from the sea bed.*

*5. The device as defined in claim 2 wherein said anchoring means comprise auger-like screws rotatably mounted in said framework and projectable downwardly therefrom into the sea bed.*

*6. The device as defined in claim 5 wherein each of said screws has a spiral flight with a central axis and a marginal edge, together with a channel-shaped member secured to and enclosing the marginal edge portion of said flight in spaced relation, said channel-shaped member having an open inner side oriented radially inwardly toward the axis of said flight, and means for delivering fluid under pressure into said channel-shaped member for discharge through the open inner side thereof, whereby to assist in loosening the screw from the sea bed.*

References Cited by the Examiner

The following references, cited by the Examiner, are of record in the patented file of this patent or the original patent.

UNITED STATES PATENTS

| | | | |
|---|---|---|---|
| 131,746 | 10/1872 | Dubois | 175—113 |
| 1,531,371 | 3/1925 | Belknap | 61—46 X |
| 2,430,014 | 11/1947 | Hansen | 61—46.5 |
| 2,581,098 | 1/1952 | Guenzel | 61—46.5 |
| 2,600,761 | 6/1952 | Halliburton | 61—46.5 |
| 2,608,829 | 9/1952 | Knapp | 61—46.5 |
| 2,621,485 | 12/1952 | Ross | 61—46.5 |
| 2,622,404 | 12/1952 | Rice | 61—46.5 |

CHARLES E. O'CONNELL, *Primary Examiner.*

J. SHAPIRO, *Assistant Examiner.*